March 22, 1966  R. M. KUTS  3,242,031
AUTOMATIC BRAND APPLIER
Filed Nov. 7, 1961  4 Sheets-Sheet 1

INVENTOR.
RICHARD M. KUTS
BY
William L. Reeve
ATTY.

INVENTOR.
RICHARD M. KUTS
BY
William L. Reeve
ATTY.

March 22, 1966     R. M. KUTS     3,242,031

AUTOMATIC BRAND APPLIER

Filed Nov. 7, 1961     4 Sheets-Sheet 3

INVENTOR.
RICHARD M. KUTS
BY
*William J. Reese*
ATTY.

March 22, 1966 R. M. KUTS 3,242,031
AUTOMATIC BRAND APPLIER
Filed Nov. 7, 1961 4 Sheets-Sheet 4
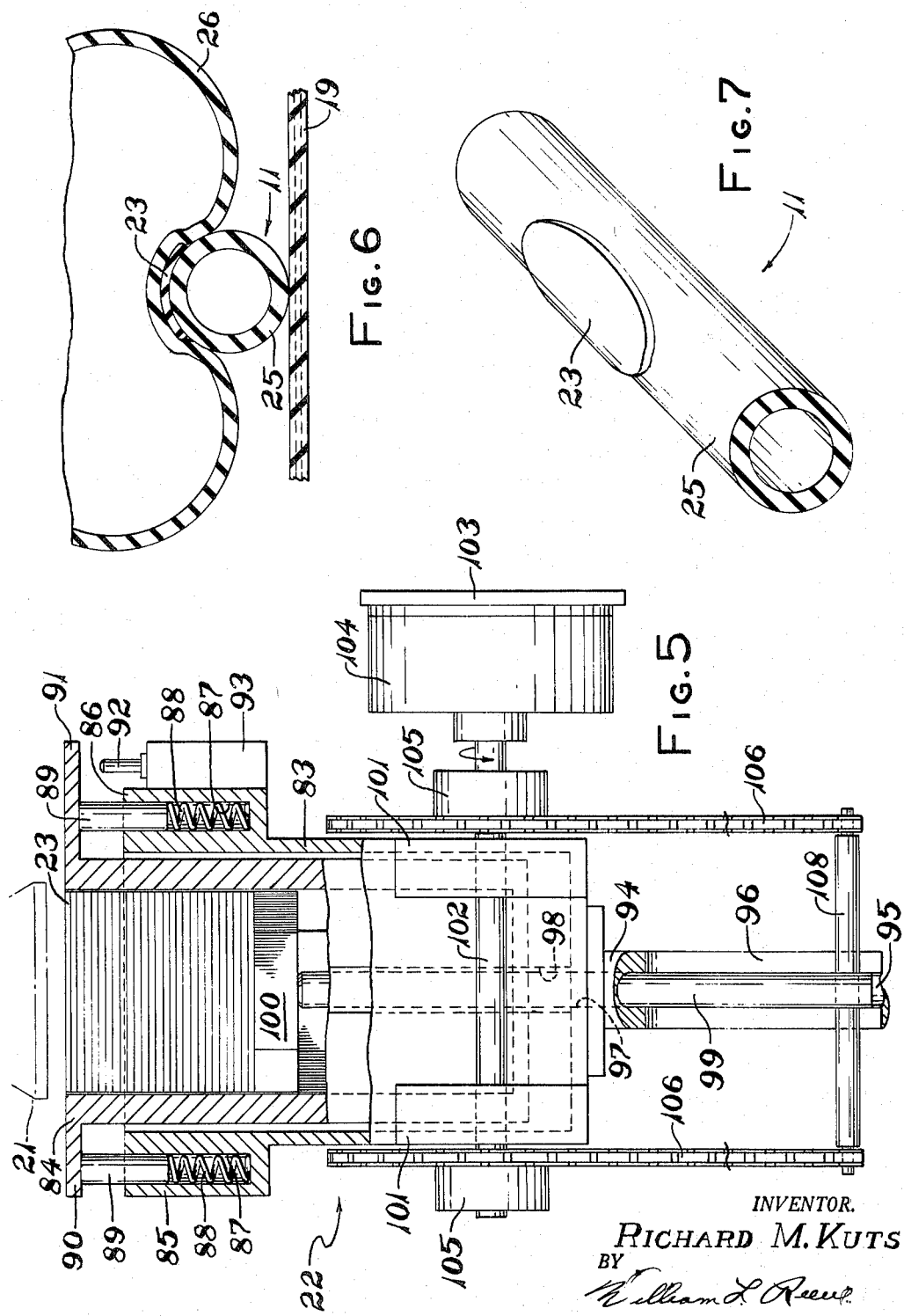
INVENTOR.
RICHARD M. KUTS
BY
William L. Reeve
ATTY.

United States Patent Office 3,242,031
Patented Mar. 22, 1966

3,242,031
AUTOMATIC BRAND APPLIER
Richard M. Kuts, Akron, Ohio, assignor to The B. F. Goodrich Company, New York, N.Y., a corporation of New York
Filed Nov. 7, 1961, Ser. No. 150,787
2 Claims. (Cl. 156—568)

This invention pertains to the identification marking of articles of manufacture, and, more particularly to the application of elastomeric identification brands to long-length elastomeric hose in predetermined spaced relationship.

In the production of long length elastomeric hose, such as what is known in the trade as vertically braided hose, proper branding has long been a troublesome bottleneck. Following the braiding of the reinforcement for such hose, the reinforcement is cemented, and a rubber cover is extruded over the cemented braid by means of a side-head extruder. As the hose leaves the extruder on the takeaway conveyor the moving hose is manually branded. The branding operator, or operators, space the brands by reference to spacing marks on the conveyor belt. Due to the fact that the hose may be issuing from the cover extruder at speeds up to 200 feet per minute, two branding operators are necessary for hose requiring relatively close brand spacing, in addition to the cover machine operator. Needless to say, unless great care is taken by the operator and the hose is moving slowly, the brands will not be properly aligned on the hose cover. As an alternative to the costly process of using two branding operators the hose could be branded by a single operator after the conclusion of the covering operations. However, to prevent the freshly extruded cover from sticking to itself when the hose is handled it is customary to pass the hose through a soapstone-in-water suspension, or a silicone-water emulsion, to name but two of the more common rubber lubricants. In order to adhere a brand to such a lubricated hose cover, the cover must be thoroughly cleaned of lubricant at the point of brand application. This, although not as costly an operation as utilizing two branding operators during the covering operation, is still a prohibitive cost factor in the hose's production.

It is an object of this invention therefore, to provide an automatic branding apparatus capable of placing brands on freshly covered, fast moving hose at any predetermined spacing.

It is another object of this invention to provide an automatic apparatus for removing brands from a supply cartridge, moving each brand to a position over a moving length of hose and releasing said brand to fall freely onto said hose.

It is a further object of said invention to provide an automatic apparatus for applying brands to hose in predetermined spaced relationship wherein the brands are stored in an open top dispenser in stacked relationship and selectively removed from said dispenser and conveyed to a position at which they are released to fall to the hose where they are then rolled down into full adhering contact with the hose.

Further objects and advantages will be apparent from the description which follows and from the drawings forming a part of this application in which:

FIG. 3 is a plan view of the apparatus with portions cut away for clarity of viewing;

FIG. 4 is a fragmentary perspective view showing the underside of the brand pickup vacuum box;

FIG. 5 is a side elevational view of the brand dispenser and cartridge with portions partially cut away;

FIG. 6 is a cross-sectional view depicting the rolling down of the brand on the hose, taken along line 6—6 of FIG. 3; and FIG. 7 is an isometric view of a segment of hose with a brand adhered thereto.

Figure 1:
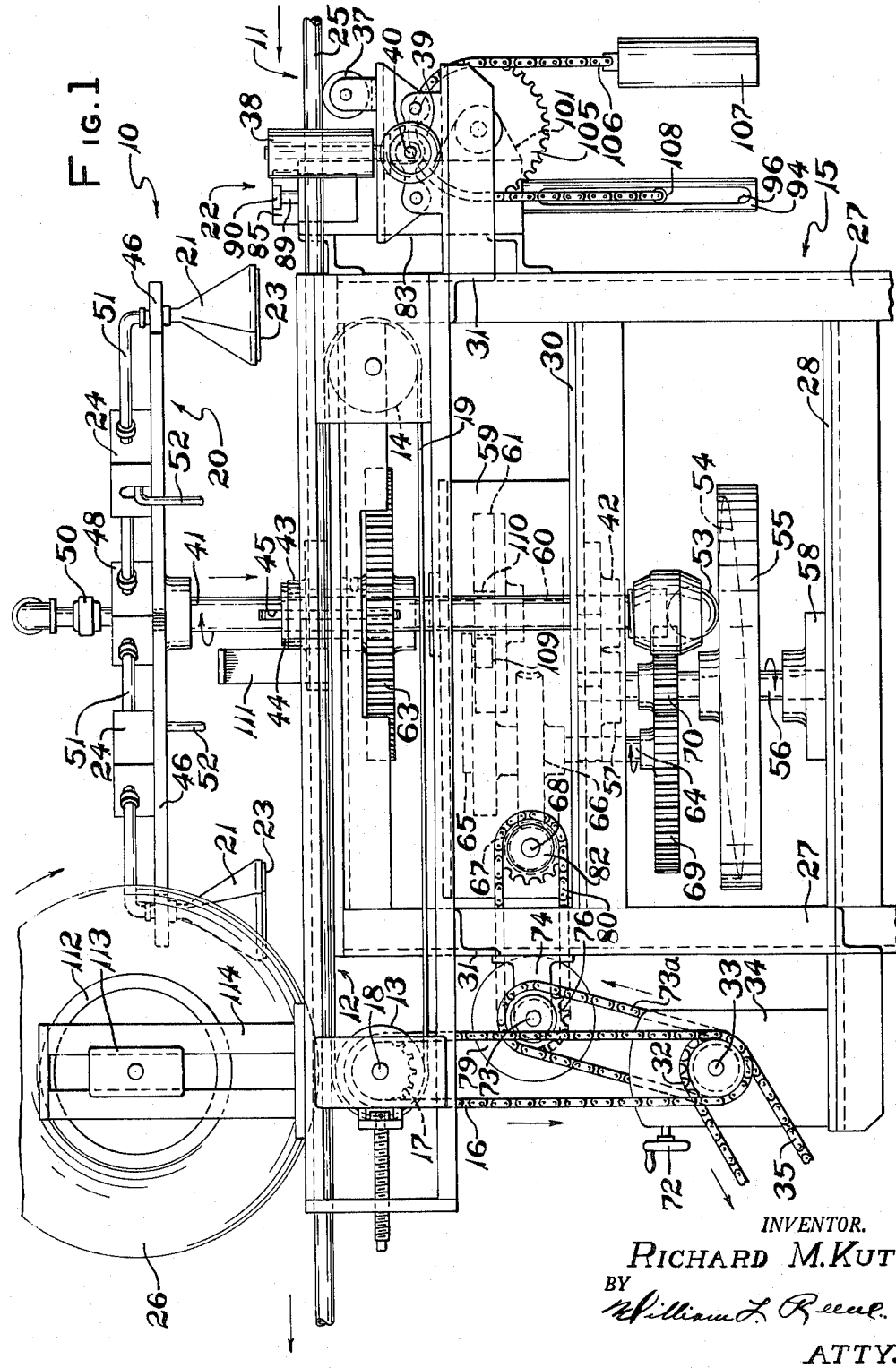
FIG. 1 is a front elevational view of the apparatus with portions partially broken away.

The presently preferred form of the apparatus embodying this invention is illustrated in the drawings in combination with a takeaway conveyor as might be used with a side-head extruder for forming the hose cover. In an apparatus 10 of this type, freshly covered hose such as 11, is received by the takeaway conveyor 12. The conveyor comprises a drive roll 13 and an idler roll 14 which are journalled in the conveyor frame members or, as in this preferred embodiment, in the frame 15 of the apparatus 10. The drive roll 13 is driven by a transmission chain 16 passing about a sprocket 17 keyed to the support shaft 18 of the roll 13. A suitable conveyor belt 19 passes about the rolls 13 and 14. As the hose 11 is conveyed in the direction of its length, a spider member 20 is caused to rotate intermittently in timed relationship with the travel of the hose moving vacuum pickups 21 mounted on the spider member in a path over that of the moving hose 11 and over a brand dispenser 22 which is mounted on one side of the apparatus. As each pickup 21 reaches a point directly above the brand dispenser 22 it is caused to be lowered to receive the uppermost brand 23 in the dispenser 22. The pickup 21 is then moved up and sequentially rotated from the dispenser 22 to a position above the moving hose 11 at which it is again lowered. When lowered sufficiently, a vacuum cutoff valve 24 is actuated, allowing the brand 23 to fall freely to the cover 25 of the hose 11. As the hose continues on it passes beneath a pneumatic stitching roll 26 which forces all portions of the brand 23 into intimate adhering contact with the hose cover 25. The hose may then be vulcanized by conventional methods.

The frame 15 of the apparatus 10 comprises four vertical stanchions 27, a lower platform 28, an upper platform 29 and an intermediate platform 30, all of which platforms are mounted on and between the stanchions 27. The aforementioned conveyor 12 is counted on a pair of cantilever supports 31 projecting horizontally from the frame 15 with the transmission chain 16 passing about sprocket 32 mounted on the input shaft 33 of a variable speed reducer 34. Shaft 33 is driven by means of a transmission chain 35 extending from a power source, not shown, about a second sprocket 36 mounted on shaft 33. Adjacent the hose inlet end of the conveyor 12 are mounted a rotatable horizontal hose support roller 37 and a pair of axially spaced rotatable vertical house guide rollers 38. The spacing between the rollers 38 may be manually adjusted by means of a hand wheel 39 mounted on an adjusting screw 40 which is threaded through the supports for the rollers 38.

Passing through platforms 29 and 30 is a vertical rotatable shaft 41 slideably journalled in platform 30 by means of a bearing 42, and in a similar bearing 43 mounted on platform 29. Bearing 43 however, journals a rotatable sleeve member 44 in which the shaft 41 is slideably keyed for rotation therewith, its keyway being seen as at 45 in FIGURE 1. Mounted on the upper end of shaft 41 is the spider member 20 having four horizontally extending arms 46. Projecting downward from the outer end of each arm 46 is a pyramidal vacuum pickup unit 21 having a plurality of perforations 47 formed in its lower face, as seen in FIG. 4. Located at the center and on top of the spider member 20 is a simple vacuum distribution manifold 48. The manifold 48 is connected to a stationary flexible vacuum line 49 by means of a rotary union 50. The interior of the pickup units 21 are in communication with the manifold 48 by means of individual vacuum lines 51. Located midway in each vacuum line 51 is a vacuum cutoff valve 24 having an actuating lever 52. On the lower end of a shaft 41 is mounted a rotatable cam follower 53 engaged with the camming surface 54 of a circular table cam 55 which is mounted on a rotatable shaft 56 journalled in bearings 57 and 58 mounted on the under-side of platform 30 and the upper side of platform 28 respectively. Camming surface 54 is formed in such a way that as cam 55 is rotated, shaft 41 is caused to move vertically up and down in sequential fashion.

Mounted upon platform 30 is a gear housing 59. Mounted within housing 59 on a vertical shaft 60 which projects above the top of the housing is a four position Geneva gear 61. Mounted at the upper end of shaft 60, above housing 59, is a spur gear 62 engaged with a second spur gear 63 mounted on the shaft 41, thus effecting rotation of spider member 20 in response to rotation of the Geneva gear 61. Mounted within housing 59, parallel to shaft 60 and extending below platform 30, is a rotatable shaft 64. On the upper end of the shaft 64 is mounted a single Geneva gear driver 65 engageable with the Geneva gear 61. Mounted on shaft 64 just below driver 65 is a worm gear 66 engaged with a worm 67 mounted on a horizontal shaft 68 journalled in the housing 59. On the lower end of shaft 64 a spur gear 69 is mounted in engagement with another spur gear 70 mounted on shaft 56 above the table cam 55. The gearing arrangement is such that for each compelte revolution of the spider member 20 the table cam 55 makes four revolutions.

From the output shaft 71 of the variable speed reducer 34, the speed of which may be varied by manually turning adjusting wheel 72, power is transmitted to an arbor 73, journalled in bearings 74 mounted on frame 15, by means of a chain 73a passing about sprockets 75 and 76 mounted on the adjacent ends of shaft 71 and arbor 73, respectively. The other end of arbor 73 is connectible with another arbor 77, journalled in bearing 78 on frame 15, by means of an electric clutch 79 which may be energized by the cover machine operator when he starts the branding operation. Another chain 80 transmits power from the other end of arbor 77 to worm shaft 68 by passing about sprockets 81 and 82 mounted on one end of arbor 77 and worm shaft 68, respectively.

Mounted on one side of the frame 15, adjacent the hose inlet end of the conveyor 12 and beneath the path of rotation of the vacuum pickups 21, is the brand dispenser 22. The dispenser comprises a housing 83 removably containing a flanged cartridge 84 containing a supply of hose brands 23. As seen in FIG. 5, the housing 83 has enlarged portions 85 and 86 at either side of its upper end each of which is bored to form a receptacle 87 containing a spring 88 resiliently supporting a rod 89 which may move axially within the receptacle. The rods 89 support the cartridge 84 by its flanges 90 and 91. Flange 91 is somewhat longer than flange 90 is order to engage the switching button 92 of a limit switch 93, mounted to one side of the enlarged portion 86 of the dispenser housing 83, when the cartridge 84 is depressed toward the housing 83. Mounted on the bottom of the housing 83 is a vertical slide guide 94 having an axial passageway 95 formed therethrough, and a slotted guide opening 96 also formed laterally therethrough in communication with said passageway 95. Slideably mounted in passageway 95 and extending through openings 97 and 98 in the dispenser housing 83 and the cartridge 84, respectively, is a piston rod 99. A piston 100 rests upon, but is not attached to, the upper end of piston rod 99 to support the brands 23 in the cartridge 84. Journalled in bearings 101 mounted on the housing 83 is a horizontal shaft 102. Mounted on frame 15 by a support member 103, see FIG. 3, is an electric brake 104 by which shaft 102 is normally kept from rotating. The brake 104 may be deenergized by actuation of limit switch 93 connected thereto by conventional wiring, not shown. Also mounted on shaft 102 are a pair of sprockets 105. Passing about a portion of each sprocket 105 is a length of chain 106, one end of which is attached to a counter-weight 107 and the other end of each of which is attached to the end of a horizontal rod 108 mounted on piston rod 99 and slideably engaged with guide slot 96. The counter weights 107 thus force the piston 100 upwards to raise the brands 23 in the cartridge 84 when the brake 104 is deenergized. It will be readily appreciated that the dispenser 22 will accommodate any size or shape of brand depending upon the internal configuration of the cartridge 84, and that brands may be changed by simply removing cartridge 84 from retainer 83 and inserting a different cartridge 84. A more complete understanding of the apparatus will be had from the following operation description.

*Operating description*

Figure 2:
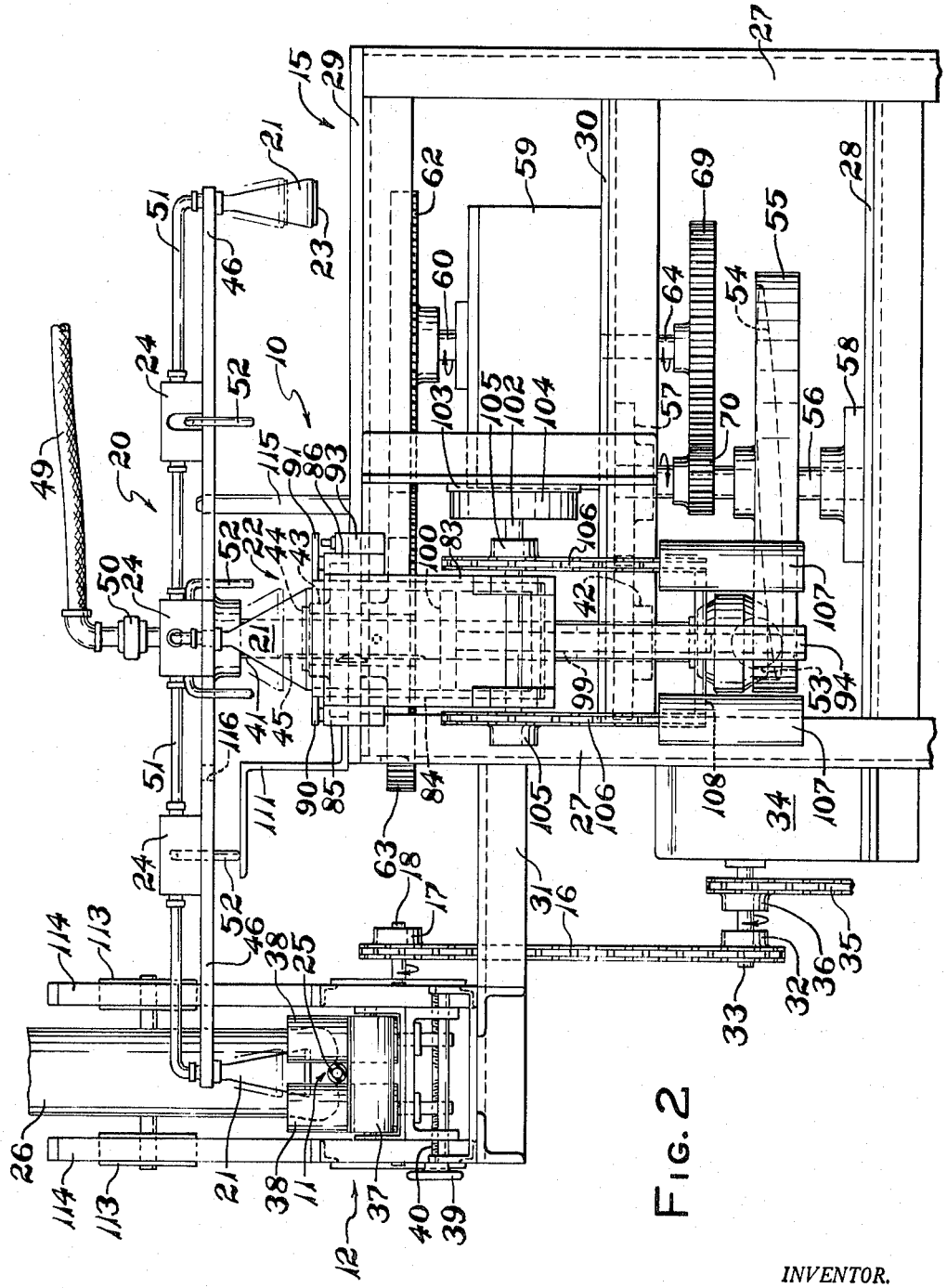
FIG. 2 is a side elevation of the apparatus as viewed from the hose delivery side of FIG. 1.

In the hose covering and branding operation the cover machine operator first starts the covering machine, not shown, which in turn, drives the conveyor 12 by means of the drive chain 35 connected to the cover machine power source. The speed at which the branding apparatus will operate, or more exactly, the frequency at which it will apply brands to the hose 11 being carried by the conveyor 12, is controlled by means of the setting of handwheel 72 of the variable speed reducer 34. Once this has been set, the operator actuates clutch 79 to engage the entire apparatus. Through transmission chains 73a and 80 the reducer 34 turns the worm 67 clockwise as viewed in FIG. 1. The worm 67 drives shaft 64 through worm gear 66 to turn the single action Geneva driver 65. At each revolution of the driver 65 a cam follower 109 mounted thereon, see FIG. 3, engages one of four cam ways 11 cut in the Geneva gear 61 to rotate the latter through 90 degrees. The spur gear 62, coaxially mounted on shaft 60 with the Geneva gear 61, drives spur gear 63 to rotate its shaft 41 and spider member 20. After the completion of each partial rotation of Geneva gear 61 the spider member 20 is aligned as shown in FIG. 3. Rotation of shaft 64 also rotates table cam 55 through spur gears 69 and 70. As cam 55 rotates, its camming surface 54 causes spider member 20 to alternately raise and lower, member 20 responding due to its connection with surface 54 through shaft 41 and cam follower 53 under the force of gravity. The surface 54 is designed such that the spider member 20 and the vacuum pickups 21 mounted thereon are in their raised positions, as shown in FIG. 1, during rotation. As the spider member reaches the position as shown in FIG. 3 it is lowered a predetermined distance by the cam 55 allowing one of the vacuum pickups 21 positioned over the brand dispenser 22 to engage and depress the dispenser cartridge 84 against the force of springs 88. As cartridge flange 91 engages and depresses the button 92 of the limit switch 93 electric current to the brake 104 is interrupted causing it to disengage shaft 102 and allowing piston rod 99 to be raised under the force of counter-weights 107. Piston rod 99 forces piston 100, within cartridge 84, against the brands 23 to force the uppermost one into engagement with the pickup 21 to be held there by the vacuum pulled through perforations 47. As cam 55 continues rotation the vacuum pickup 21 is raised to disengage the cartridge 84 which also rises under the force of springs 88 to disengage limit switch 93 and again actuate brake 104, the remaining brands 23 in cartridge 84 having been moved to the top of the cartridge 91. The pickup 21 then progresses counter-clockwise as seen in FIG. 3 until it is in position over the moving hose 11. Cam 55 again causes it to move downward toward the hose. As it moves downward, the actuating lever 52 of the vacuum cutoff valve 24 serving that pickup 21 engages a limiting bracket 111 mounted on platform 29 to thereby release the brand 23 held thereby and allow it to fall freely to the fresh, tacky cover 25 of the hose 11. As the hose proceeds with the brand 23 lightly adhered thereto it passes beneath a pneumatic stitching roll 26 which is mounted on a rim 112 journalled in a pair of slide blocks 113 that are free to slide vertically in slideguides 114 mounted at the hose discharge end of the conveyor 12. The roll 26 is inflated to a low pressure in the order of 2 to 5 p.s.i. so that it will conform to the hose 11 as seen in FIG. 6, and force all portions of the brand 23 into intimately adhering contact with the hose cover 25 for subsequent vulcanization. It will be seen in FIGS. 2 and 3 that the alignment of the pickups 21 on the spider member 20 over the hose 11 and the brand dispenser 22 is positively controlled by means of a vertical pin 115 mounted on platform 29 which registers with a register hole 116 formed in each arm 46 of the spider member 20 each time the member is lowered.

Although the apparatus has been described with reference to a specific, preferred embodiment thereof, it will be readily apparent to those skilled in the art to which it pertains that changes and modifications may be made thereto within the spirit and scope of the appended claims.

Having thus described the invention, I claim:

1. Apparatus for applying elastomeric identification brands to the outer surface of elastomeric hose in predetermined spaced relationship, said apparatus comprising a brand dispenser chamber mounted on said apparatus, a brand cartridge resiliently and removably supported by said chamber, a brand moving piston slideably contained within said cartridge, a piston rod mounted for movement within said chamber and for contact with said piston, a conveyor to move said hose in the direction of its length past a work performing station of said apparatus, a rotatable shaft slideably mounted for movement in a vertical direction on said apparatus, a plurality of arms mounted on said shaft perpendicularly thereto, a vacuum brand gripping head mounted on each of said arms, intermittent gear means to rotate said gripping heads sequentially to a position adjacent said brand cartridge and to said work station, cam means operatively connected to said arms to move each of said gripping heads in a direction parallel to said vertical direction to and from brand gripping contact with said cartridge when adjacent thereto and downwardly and away from said conveyor when at said work station, means responsive to said brand gripping contact to urge said piston rod against said piston, means responsive to said downward movement toward said conveyor to release a brand gripped by said vacuum head at said work station to apply such released brand to the top of the hose, and means mounted in the path of said moving hose urging said brand so released into intimate contact with said hose.

2. Apparatus for applying identification labels to the outer surface of a continuously moving hose, said apparatus comprising: conveying means for moving such a hose in the direction of its length, label dispensing means mounted on said apparatus, an indexable member mounted on said apparatus, a plurality of spaced gripping means mounted on said indexable member for movement therewith, means to rotatably index said member and said gripping means in a sequential path over said dispensing means and over said conveying means at a predetermined speed relative to the speed of said conveying means and moving hose, means for moving each of said gripping means during alignment with said dispensing means in a direction perpendicular to the plane of rotation to and from said dispensing means for gripping a label while simultaneously moving each of said gripping means during alignment over said conveying means in a direction perpendicular to the plane of rotation to and from said conveying means for releasing a label gripped thereby, and stitching means mounted in the path of said conveying means to stitch such label to such moving hose.

References Cited by the Examiner

UNITED STATES PATENTS

| | | | |
|---|---|---|---|
| 583,376 | 5/1897 | Happe | 156—572 |
| 1,519,546 | 12/1924 | Marquette | 156—493 |
| 2,122,554 | 7/1938 | Brautigam | 156—493 |
| 2,214,096 | 9/1940 | Weiss | 156—568 |
| 2,279,844 | 4/1942 | Smith et al. | 156—568 XR |
| 2,341,988 | 2/1944 | Heintz | 156—421 XR |
| 2,581,933 | 1/1952 | Stevens | 156—421 XR |

EARL M. BERGERT, *Primary Examiner.*

M. L. KATZ, R. I. SMITH, *Assistant Examiners.*